Patented Aug. 7, 1945

2,381,701

UNITED STATES PATENT OFFICE 2,381,701

PRODUCTION OF CONDENSATION PRODUCTS OF ACETYLENE

Hanns Peter Staudinger, Ewell, and Karl Heinrich Walter Tuerck, Banstead, England, assignors to The Distillers Company Limited, Edinburgh, Scotland, a British company No Drawing. Application March 6, 1942, Serial No. 433,630. In Great Britain December 20, 1940

7 Claims. (Cl. 260—644)

The present invention is for improvements in or relating to the production of condensation products of acetylene.

According to the present invention a process for the production of condensation products of acetylene, comprises condensing acetylene with a nitro-compound having a non-cyclic $CH \cdot NO_2$ group.

The invention is applicable to the condensation of acetylene with the nitro-paraffins, e. g. nitro-methane and its homologues.

The condensation is carried out in the liquid phase and in the presence of catalysts. Mercuric salts have been found to be suitable as catalysts. The catalysts are preferably prepared by precipitation in situ; for example, by adding sulphuric acid to a reaction mixture in which a mercuric salt is dissolved or suspended.

The reaction may be carried out in the presence or absence of solvents. Suitable solvents include inert oxygen-containing substances, such as ketones, ethylidene diacetate or the liquid reaction products obtained during the reaction which remain as the residue after the lower boiling unsaturated reaction products have been removed by distillation.

In most cases the reaction proceeds at normal pressure, but preferably increased pressure is employed. The temperature at which the reaction is carried out varies according to the nature of the reagent employed and its concentration.

The reaction usually starts at room temperature and it is generally advisable to cool the reaction mixture so as to prevent the temperature rising to a point at which undesirable secondary reactions or decomposition take place; we prefer not to allow the temperature to rise above 100° C.

The following example illustrates the invention with reference to the condensation of acetylene with nitromethane:

To 50 g. nitromethane in which 4 g. mercuric acetate are dissolved, 2 g. sulphuric acid are added, so that a precipitate is formed. Into this reaction mixture acetylene is introduced at room temperature till no further absorption takes place. After the catalyst has been neutralised and filtered off, the reaction product is distilled. The distillate contains the unsaturated addition product of acetylene with nitromethane. The yield can be increased by the use of increased pressure, for example, 3–10 atmospheres.

The vinyl nitro compounds obtained in accordance with this invention can be extracted from the reaction product with aqueous alkalis so that the reaction product is not, or is at least only for a short time, subjected to high temperatures.

We claim:

1. A process for the production of a 1-nitropropene having in the 1-position a substituent which is a member of the class consisting of hydrogen and alkyl groups which comprises condensing acetylene in the liquid phase with a nitro-paraffin, in which the nitro-group is attached to a terminal carbon atom, at a temperature not in excess of 100° C. and in the presence of a condensation catalyst consisting of a mercuric salt of an inorganic acid.

2. A process for the production of a 1-nitropropene which comprises condensing acetylene with nitromethane in the liquid phase at a temperature not in excess of 100° C. and in the presence of a condensation catalyst consisting of a mercuric salt of an inorganic acid.

3. A process according to claim 1 wherein the condensation is effected under superatmospheric pressure.

4. A process according to claim 2 wherein the condensation is effected under superatmospheric pressure.

5. A process according to claim 1 wherein the condensation is effected in the presence of an inert solvent.

6. A process according to claim 2 wherein the condensation is effected in the presence of an inert solvent.

7. A process according to claim 1 wherein the condensation catalyst is a mercuric salt prepared in situ by the addition of an inorganic acid to a reaction mixture in which there is present a mercuric compound.

HANNS PETER STAUDINGER.
KARL HEINRICH WALTER TUERCK.